US012794098B2

(12) United States Patent
Holzer

(10) Patent No.: US 12,794,098 B2
(45) Date of Patent: Nov. 10, 2026

(54) SPIN WAVE FAST TUNABLE FILTER

(71) Applicant: L3Harris Technologies, Inc., Melbourne, FL (US)

(72) Inventor: Kyle D. Holzer, Bountiful, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 18/960,249

(22) Filed: Nov. 26, 2024

(65) Prior Publication Data

US 2026/0149157 A1 May 28, 2026

(51) Int. Cl.
*H01P 1/213* (2006.01)

(52) U.S. Cl.
CPC .................................... *H01P 1/213* (2013.01)

(58) Field of Classification Search
CPC ....................................................... H01P 1/213
USPC ........................................... 333/202; 455/296
See application file for complete search history.

(56) References Cited

U.S. PATENT DOCUMENTS

| | | | | |
|---|---|---|---|---|
| 4,270,223 A * | 5/1981 | Marston | H04B 1/123 455/249.1 |
| 10,756,692 B2 | 8/2020 | Gillette | |
| 2019/0267960 A1* | 8/2019 | Gillette | H01P 1/38 |
| 2022/0285813 A1 | 9/2022 | Geiler | |
| 2023/0261354 A1 | 8/2023 | Kulik et al. | |

FOREIGN PATENT DOCUMENTS

| | | |
|---|---|---|
| JP | 2000-165108 | 6/2000 |
| WO | 2014113613 A1 | 7/2014 |

OTHER PUBLICATIONS

Bonner-Stewart, Jeffrey et al., "Tunable 0.7-2.8-GHz Reflection-Mode N-Path Filters in 45-nm SOI CMOS," IEEE Transactions on Microwave Theory and Techniques, vol. 68, No. 6, Jun. 2020, pp. 2343-2357.
Cheng, Chih-Chieh et al., "A Three-Pole 1.2-2.6-GHz RF MEMS Tunable Notch Filter With 40-dB Rejection and Bandwidth Control," IEEE Transactions on Microwave Theory and Techniques, vol. 60, No. 8, Aug. 2012, pp. 2431-2438.
Sharma, Abhishek et al., "Remote Reconfiguration of Microwave Filters Using Dielectric Tuners," IEEE Transactions on Microwave Theory and Techniques, vol. 71, No. 7, Jul. 2023, pp. 3051-3064.
Du, Xingyu et al., "Frequency Tunable Magnetostatic Wave Filters with Zero Static Power Magnetic Biasing Circuitry," Nature Communications 15:3582, Published Apr. 27, 2024, pp. 1-10.
Geller, Michael et al., "Microwave Magnetics and Considerations for Systems Design," IEEE Jounal of Microwaves, vol. 1, No. 1, Jan. 2021, 9 pp.
European Search Report dated Jul. 29, 2026 issued in European Patent Application No. 25210377.5, 13 pp.

* cited by examiner

*Primary Examiner* — Andrea Lindgren Baltzell
*Assistant Examiner* — Victor Cole
(74) *Attorney, Agent, or Firm* — NIXON & VANDERHYE P.C.

(57) ABSTRACT

An electronic filter for filtering multiple signals including a signal of interest and an other spectral content induces a desired frequency selective limiter response with activator signals. The activator signals have an approximately 180-degree phase difference and effectively cancel in a final combiner, leaving only the desired filter response.

26 Claims, 7 Drawing Sheets

SPIN WAVE FAST TUNABLE FILTER

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to an electronic filter and, more particularly, to an electronic filter that attenuates spectral content such as a jammer signal using activator signals.

Software defined radios utilize highly reconfigurable filters in both transmit and receive signal chains. Filters should be reconfigurable in both frequency and rejection magnitude, and it is desirable to minimize size, weight, and power (SWaP). Filter re-tuning speed should be minimized to allow versatility to be used with covert waveforms.

CUAS (counter-unmanned aircraft system) jammer resilience may require tunable filters that are simple to operate, with little or no external knowledge of jammer location/size and that are small in SWaP.

Rapidly reconfigurable performance filters may facilitate advancement of high-performance communication systems, including software defined radios and phased array systems. High speed data converters such as analog-to-digital converters (ADCs) and digital-to-analog converters (DACs) are still pushing the boundaries of our imagination for sampling speed and fidelity but are not fully capable of replacing discrete mode communication system implementations without equally advanced tunable filters with which to pair.

Common limitations of tunable filters include: flexible bandwidth (BW), frequency coverage, available Q-factor, insertion loss, power handling, linearity, temperature stability, reconfiguration settling time, size, complexity, and cost.

Engineering trade-offs can commonly be compared to reshaping an inflated balloon. When one side or feature is compressed, another side or feature will necessarily expand as a consequence. It is not common to realize a technical advancement that improves many areas at the same time.

SUMMARY

The spin wave fast tunable filter (SWiFT) of the described embodiments offers improvements or parity for a majority of the common limitations of tunable filters listed above. Spin wave devices or frequency selective limiters (FSLs), also categorized as magnetostatic devices, are medium to low performers in the categories of frequency coverage and cost. Current spin wave devices typically cover from 10-50% BW frequency coverage.

The electronic filter of the described embodiments induces a desired frequency selective limiter response with activator signals. The activator signals have 180-degree phase difference and essentially cancel in a final combiner, leaving only the desired frequency selective limiter response. The filter can effect tuning/filtering in less than 3 μs.

In an exemplary embodiment, an electronic filter includes a splitter that is configured to split a signal of interest and an other spectral content onto a first circuit leg and a second circuit leg, and a signal generator that is configured to generate an activator signal. A first combiner on the first circuit leg is configured to inject the activator signal at a frequency matching the other spectral content, and a second combiner on the second circuit leg is configured to inject the activator signal at a frequency matching the other spectral content. The activator signal in the second circuit leg is phase shifted approximately 180 degrees relative to the activator signal in the first circuit leg. A first frequency selective limiter on the first circuit leg is configured to attenuate both the activator signal and the other spectral content on the first circuit leg by a first dB of attenuation to a threshold power level of the first frequency selective limiter, and a second frequency selective limiter on the second circuit leg is configured to attenuate both the activator signal and the other spectral content on the second circuit leg by a second dB of attenuation to a threshold power level of the second frequency selective limiter. A third combiner is configured to generate a filter output based on combining the attenuated activator signal, the attenuated other spectral content, and the signal of interest from the first frequency selective limiter with the attenuated activator signal, the attenuated other spectral content, and the signal of interest from the second frequency selective limiter.

The signal generator may be configured to generate the activator signal based on characteristics of the other spectral content.

The signal generator may be configured to generate the activator signal at frequency and power levels above the threshold power level of the first frequency selective limiter and at frequency and power levels above the threshold power level of the second frequency selective limiter. In this context, the activator signal may be comprised of a multiplicity of frequencies above the threshold power levels of the first and second frequency selective limiters in order to activate a frequency response by the first and second frequency selective limiters that produces an overall filter response. In some embodiments, N number of additional circuit leg pairs may be added with respective frequency selective limiter pairs that cover additional frequency ranges not covered by frequency selective limiter pairs in the N−1 circuit leg pairs, where each circuit leg pair may be configured so the activator signal may be phase shifted approximately 180 degrees in one leg relative to the other leg.

The first and second frequency selective limiters comprise spin wave limiters. The filter may additionally include a low noise amplifier between the antenna and the splitter. The filter may additionally include a pre-frequency selective limiter between the antenna and the splitter.

The third combiner may include a 180 degree hybrid combiner including a delta port outputting to the signal generator. The signal generator may include a field programmable gate array (FPGA). The delta port may be configured to output to the FPGA for active feedback and adjustment of the activator signal.

In some embodiments, the other spectral content may be a jammer signal.

The first and second frequency selective limiters may be configured such that the attenuation by the first and second frequency selective limiters is a frequency specific attenuation that does not impact the signal of interest and rather targets the other spectral content.

In another exemplary embodiment, an electronic filter for filtering multiple signals including a signal of interest and a jammer signal input to an antenna includes a first circuit leg configured to receive the signal of interest and the jammer signal, a second circuit leg in parallel with the first circuit leg and configured to receive the signal of interest and the jammer signal, and an input combiner on each of the first circuit leg and the second circuit leg that is configured to inject an activator signal on each of the first and second circuit legs at a frequency matching the jammer signal. The activator signal in the second circuit leg is phase shifted approximately 180 degrees relative to the activator signal in the first circuit leg. A spin wave limiter on each of the first circuit leg and the second circuit leg is configured to attenuate the jammer signal and the activator signal to a threshold power level of the spin wave limiter. An output combiner is configured to combine an output signal on the first circuit leg with an output signal on the second circuit leg and generate a filter output.

In yet another exemplary embodiment, a method of filtering multiple signals includes the steps of splitting, with a splitter, a signal of interest and an other spectral content onto a first circuit leg and a second circuit leg; generating, with a signal generator, an activator signal; injecting, with a first combiner on the first circuit leg, the activator signal at a frequency matching the other spectral content; injecting, with a second combiner on the second circuit leg, the activator signal at a frequency matching the other spectral content, wherein the activator signal in the second circuit leg is phase shifted approximately 180 degrees relative to the activator signal in the first circuit leg; attenuating, with a first frequency selective limiter on the first circuit leg, both the activator signal and the other spectral content on the first circuit leg by a first dB of attenuation to a threshold power level of the first frequency selective limiter; attenuating, with a second frequency selective limiter on the second circuit leg, both the activator signal and the other spectral content on the second circuit leg by a second dB of attenuation to a threshold power level of the second frequency selective limiter; and generating, with a third combiner, a filter output by combining the attenuated activator signal, the attenuated other spectral content, and the signal of interest from the first frequency selective limiter with the attenuated activator signal, the attenuated other spectral content, and the signal of interest from the second frequency selective limiter.

BRIEF DESCRIPTION OF THE DRAWINGS

These and other aspects and advantages will be described in detail with reference to the accompanying drawings, in which.

DETAILED DESCRIPTION

In some embodiments, the described electronic filter incorporates one or more FSLs or spin wave limiters that function to limit or control the power of a signal. FSLs in the form of spin wave limiters are known. An RF signal propagates along a transmission line across which a crystal structure is disposed. Magnetic components surround the crystal structure and are tuned to a specific frequency such that the signal propagates cleanly when below a threshold, but when above the threshold, electromagnetic waves effect the magnetic structure to attenuate the signal. The FSLs are frequency-selective, thus only causing attenuation in the approximate frequency spectrum that matches the RF signal that is above the FSL power threshold, thus permitting other frequency signals to propagate unperturbed and without distortion.

Figure 1:
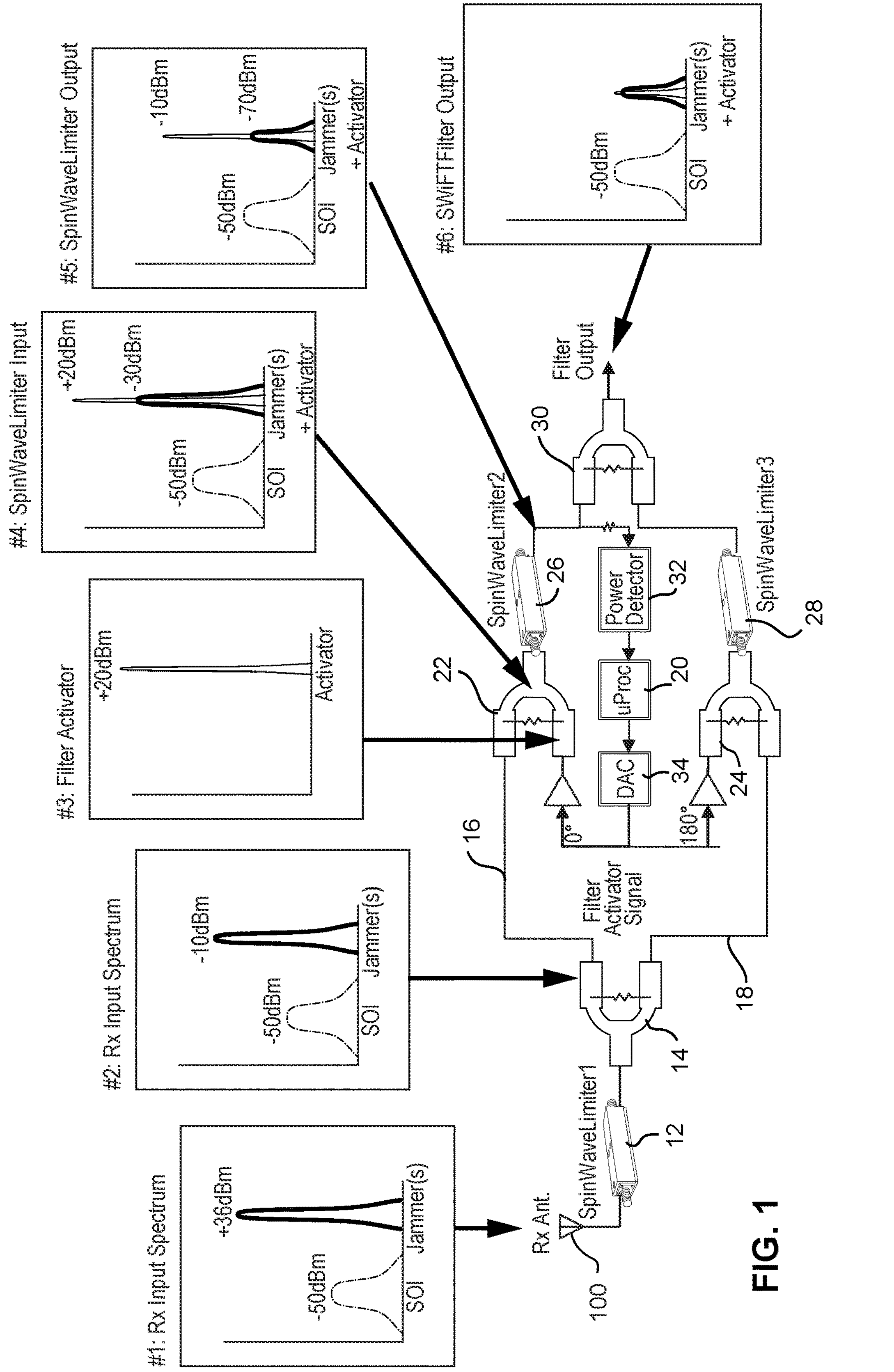
FIG. 1 is a circuit diagram showing the electronic filter of the described embodiments along with frequency responses at designated signal points.

FIG. 1 shows an exemplary circuit diagram for the electronic filter of an embodiment. Designated signal points each includes a chart showing signal frequencies/power at the signal points.

The target operational scenario includes both a signal of interest (SOI) and some other spectral content (such as a jammer signal) input to an antenna 100. In other embodiments, the other spectral content is an adjacent intended transmit signal. The other spectral content is higher in magnitude compared to the SOI. In some embodiments, the signals are first processed via an upstream FSL or pre-spin wave limiter 12, which serves to protect the circuit and receiver by reducing high power signals to a threshold of the FSL 12. In the exemplary embodiment shown in FIG. 1, the upstream FSL 12 limits the other spectral content (e.g., the jammer signal) to −10 dBm.

A splitter 14 is configured to split the SOI and the other spectral content onto a first circuit leg 16 and a parallel second circuit leg 18 such that both the SOI and the other spectral content (e.g., the jammer signal) flow through each of the first circuit leg 16 and the second circuit leg 18. A signal generator 20 is programmed to generate an activator signal (discussed in more detail below). A first combiner 22 on the first circuit leg 16 is configured to inject the activator signal at a frequency essentially matching the other spectral content. A second combiner 24 on the second circuit leg 18 is configured to inject the activator signal at a frequency essentially matching the other spectral content. On the second circuit leg 18, the activator signal is phase shifted approximately 180 degrees relative to the activator signal on the first circuit leg 16.

The phrase "essentially matching" means identical or substantially close, e.g., 90%, 95%, 99%, and depends on the specific physical attributes of the FSL/spin wave limiter. An exemplary spin wave limiter is the ATF-0501-1618N8 available from Meta Magnetics, which should be within 5 MHz.

The phrase "approximately 180 degrees" means enough phase shift such that the activator signals substantially cancel each other. For example, a range between 175 degrees to 185 degrees will work, although not ideally. The phase shift is intended to substantially negate the activator signals at the output of the final combiner (described below), e.g., by an order of magnitude sufficient to enable clear reception of the SOI.

A first FSL 26 shown as a first spin wave limiter is positioned downstream of the first combiner 22 on the first circuit leg 16. A corresponding second FSL 28 shown as a second spin wave limiter is positioned on the second circuit leg 18. The spin wave limiters shown in FIG. 1 are exemplary FSLs for description purposes, and the described embodiments are not necessarily meant to be limited to the illustrated structures.

The first and second spin wave limiters 26, 28 are configured to attenuate the other spectral content and the activator signal. The activator and other spectral content will both be attenuated by the same amount of attenuation. The amount of attenuation is approximately equal to the number of dB difference between the activator signal power at the input of the spin wave limiter 26, 28 and the threshold power level of the spin wave limiters 26, 28, respectively. The activator signals injected in the combiners 22, 24 include frequency and power levels intentionally above the first and second spin wave limiter thresholds. The activator signals create attenuation at that frequency, thereby inducing a filter effect by the spin wave limiters 26, 28. The activator signals are then limited down to the limiter threshold (e.g., −10 dBm), which effects additional attenuation of the other spectral content. The first and second FSLs 26, 28 are configured such that the attenuation by the FSLs 26, 28 is a frequency specific attenuation that does not impact the signal of interest and rather targets the other spectral content. In the exemplary embodiment shown in FIG. 1, with the other spectral content in the form of a jammer signal, the FSLs 26, 28 effect an additional 40-50 dB attenuation of the jammer signal.

In some embodiments, the activator signal is comprised of a multiplicity of frequencies above the threshold power levels of the first and second FSLs 26, 28 in order to activate a frequency response by the first and second FLSs that produces an overall filter response.

A third combiner 30 combines an output signal from the first circuit leg 16 with an output signal from the second circuit leg 18 to generate the filter output. Because the activator signal on the first circuit leg 16 is phase shifted approximately 180 degrees relative to the activator signal in the second circuit leg 18, the activator signals essentially cancel in the third combiner 30, leaving only the desired FSL/spin wave limiter frequency selective attenuation response. The remaining activator signal shown in the SWiFT filter output chart in FIG. 1 is a product of phase noise, amplitude imbalance, and other contributing factors. Corrections to amplitude can be made with variable attenuator(s) directly after the FSLs 26, 28 as needed. The filter effect reduces the other spectral content to levels below those that affect the SOI. That is, the third combiner 30 is configured to generate a filter output based on combining the attenuated activator signal, the attenuated other spectral content, and the SOI from the first frequency selective limiter 26 with the attenuated activator signal, the attenuated other spectral content, and the SOI from the second frequency selective limiter 28.

A power detector 32 enables the signal generator 20 to intelligently decide frequency and power levels for the activator signals to induce the filter response. The signal generator 20 identifies the power levels and frequency of the other spectral content to then generate an activator signal that is a copy of what is input through the antenna so that the activator tone can induce the response. A DAC 34 creates the activator tone for injection into the first and second combiners 22, 24. The signal generator 20 is thus configured to generate the activator signal based on characteristics of the other spectral content (e.g., the jammer signal). The signal generator 20 may be a discrete chip, a processor, an FPGA, etc. To the extent that it is a discrete chip, it may not need a processor, programming, etc. For example, the signal generator could be a DAC.

As noted, the first and second combiners 22, 24 inject the activator signals at a frequency essentially matching the other spectral content.

Figure 2:
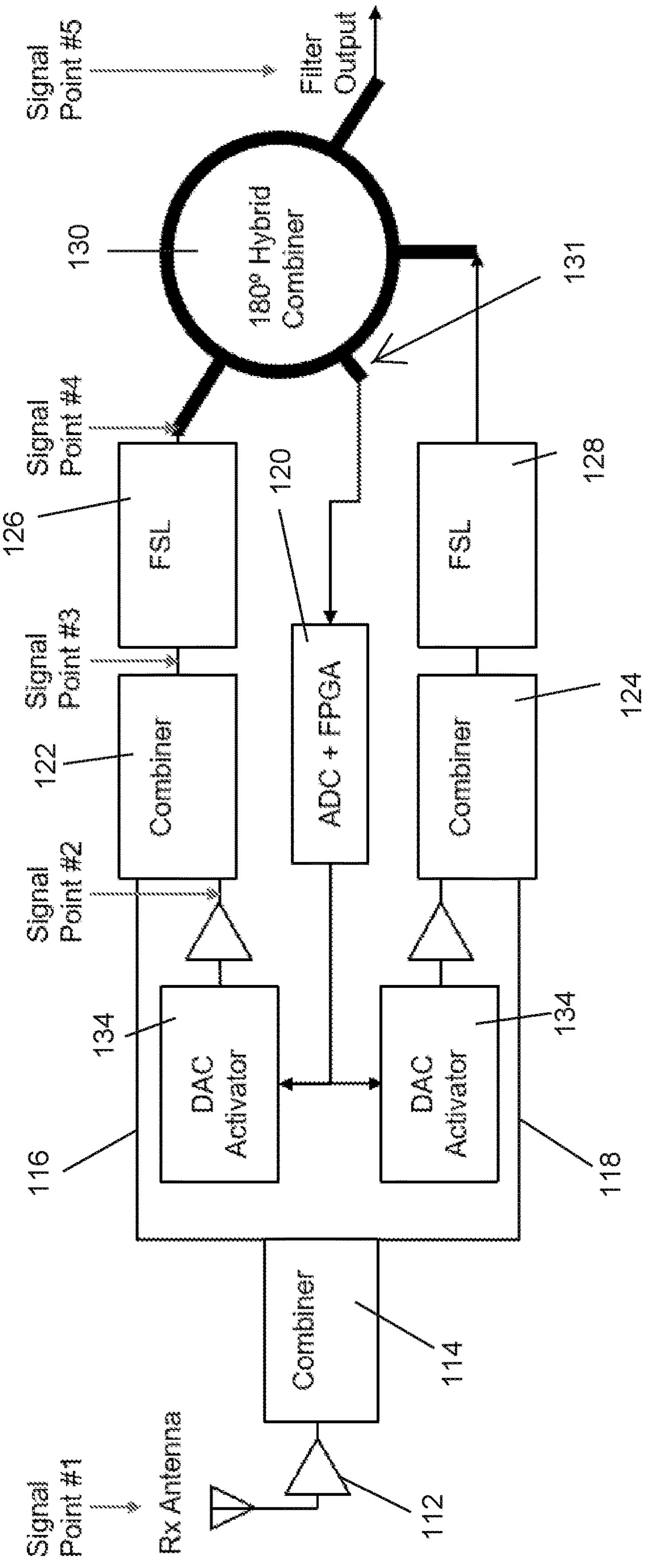
FIG. 2 shows a variation using a 180 degree hybrid combiner for the filter output.

FIG. 2 shows a variation of the filter architecture with designated signal points. The signal points are called out along the signal path to help explain filter functionality. DAC, ADC, and FSL components are shown. In some embodiments, the FSLs comprise spin wave limiters. The target operational scenario includes both the SOI and the other spectral content (e.g., jammer signal) present in the spectrum at signal point #1, at the Rx antenna input. The other spectral content is higher in magnitude compared to the SOI. The SOI and other spectral content are first processed through an upstream low noise amplifier 112, which serves to set the receive noise figure and sensitivity, protecting the receive sensitivity performance from degradation typically caused by additional signal path loss introduced by a subsequent splitter 114, combiners 122, 124, FSLs 126, 128, and combiner 130. The splitter 114 is configured to split the SOI and the other spectral content onto a first circuit leg 116 and a parallel second circuit leg 118 such that both the SOI and the other spectral content flow through each of the first circuit leg 116 and the second circuit leg 118.

An activator signal is injected via DACs 134 at signal point #2 into a first combiner 122 on the first circuit leg 116 and into a second combiner 124 on the second circuit leg 118 at essentially the same frequency as the other spectral content. In the exemplary configuration shown, the activator signal level is 30 dB higher than the FSL power threshold level. The same activator signal and level is injected into the second combiner 124, but with a 180-degree offset. The SOI, other spectral content, and activator signals are present unchanged at signal point #3 at the FSL input.

At signal point #4 (FSL output), SOI is not significantly changed, but the activator signal level is reduced down to the FSL threshold power level by first and second FSLs 126, 128 on the first and second circuit legs 116, 118, respectively. The other spectral content is also reduced by the FSL filter response as described above.

A 180-degree hybrid combiner 130 uses sum and delta functionality via a delta port 131 to create the desired spectrum at signal point #5. SOI signals add in phase, and the activator signals cancel at the filter output and are routed to an ADC+FPGA (field programmable gate array) port 120 for active feedback and adjustment of the activator signals, and the other spectral content has been reduced by the activated FSL filter response.

As described above, the activator signal is injected into the FSL to create the intended filter response. Filter response depth is dependent on activator signal level. The bandwidth, or selectivity, of the filter response is not adjustable for a given FSL. Selectivity is primarily dependent on the material selection and quality. Filter response bandwidth can be increased with the use of multi-tone activator. Similarly, complex multi-band pass or notch filter responses can be achieved with use of complex activator signals. FSL response time is typically <100 ns, enabling rapid reconfigurability of the SWiFT filter.

Alternate configurations can be used to optimize the filter for specific applications. For example, an unmanned drone application may replace the input LNA (low noise amplifier) for a first stage FSL to enable much high interferer power handling. This would increase overall noise figure, which may be a reasonable trade-off where wireless link budgets may have sensitivity margin.

Figure 5:
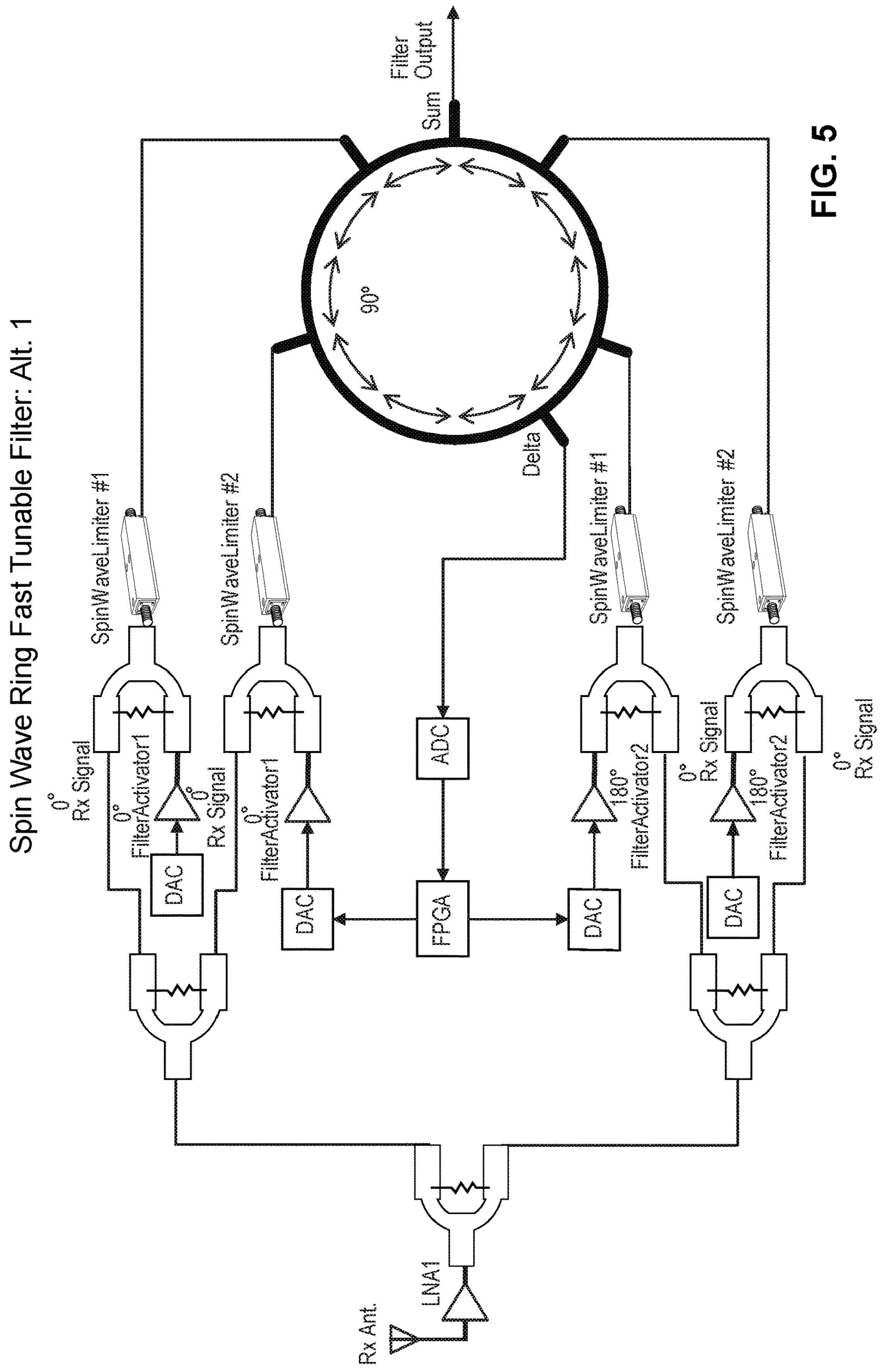
FIGS. 5-7 show exemplary circuit diagrams with additional circuit leg pairs added with respective frequency selective limiter pairs that cover additional frequency ranges.
Figure 6:
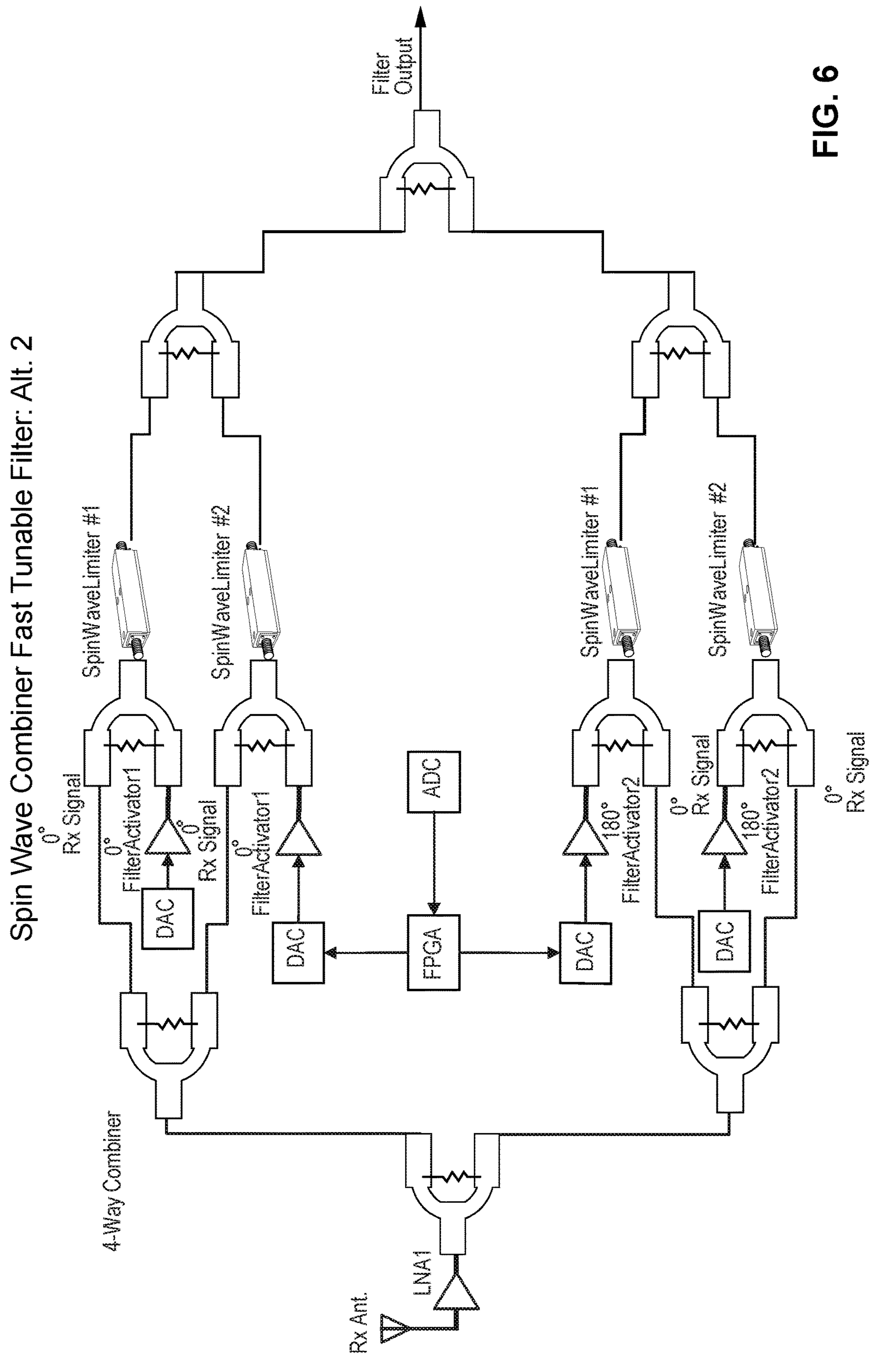
Figure 7:
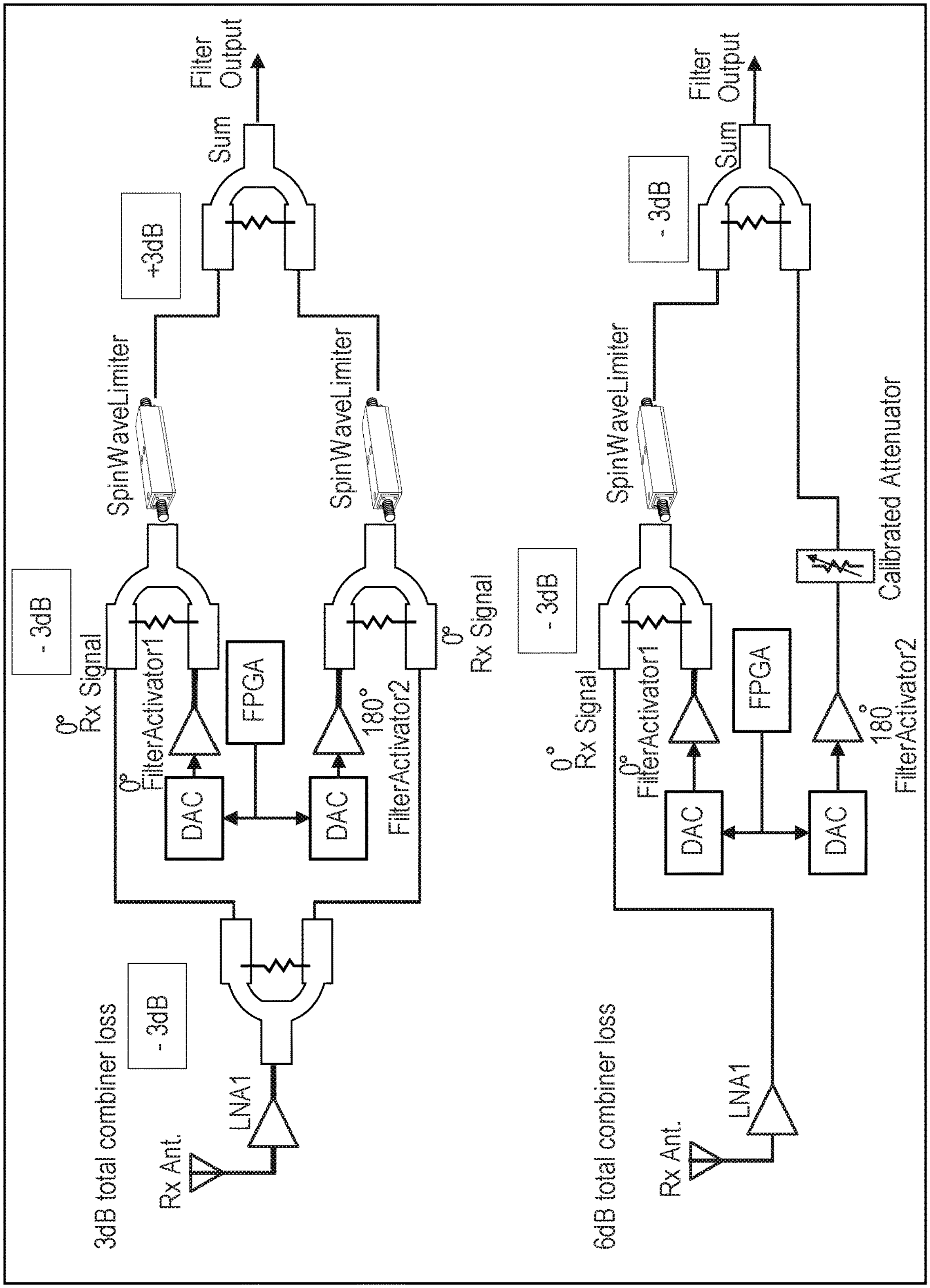

Another alternate configuration replaces the 180-degree hybrid combiner 130 with a broadband 2-way combiner. A power coupler can be used for the sensing feedback loop as needed. Additionally, multiple band specific FSL devices can be combined with similar 180-degree mirrored/split branches to enable multi-band performance. That is, additional circuit leg pairs (e.g., N number of additional circuit leg pairs) may be added with respective frequency selective limiter pairs that cover additional frequency ranges not covered by frequency selective limiter pairs in prior circuit leg pairs (e.g., N−1 circuit leg pairs). Each circuit leg pair is configured so the activator signal is phase shifted approximately 180 degrees in one leg relative to the other leg. Exemplary circuit diagrams with additional circuit leg pairs are shown in FIGS. 5-7.

Amplitude adjustment may also be added after the FSL units before combining to compensate for FSL power threshold imperfections in manufacturing.

Figure 3:
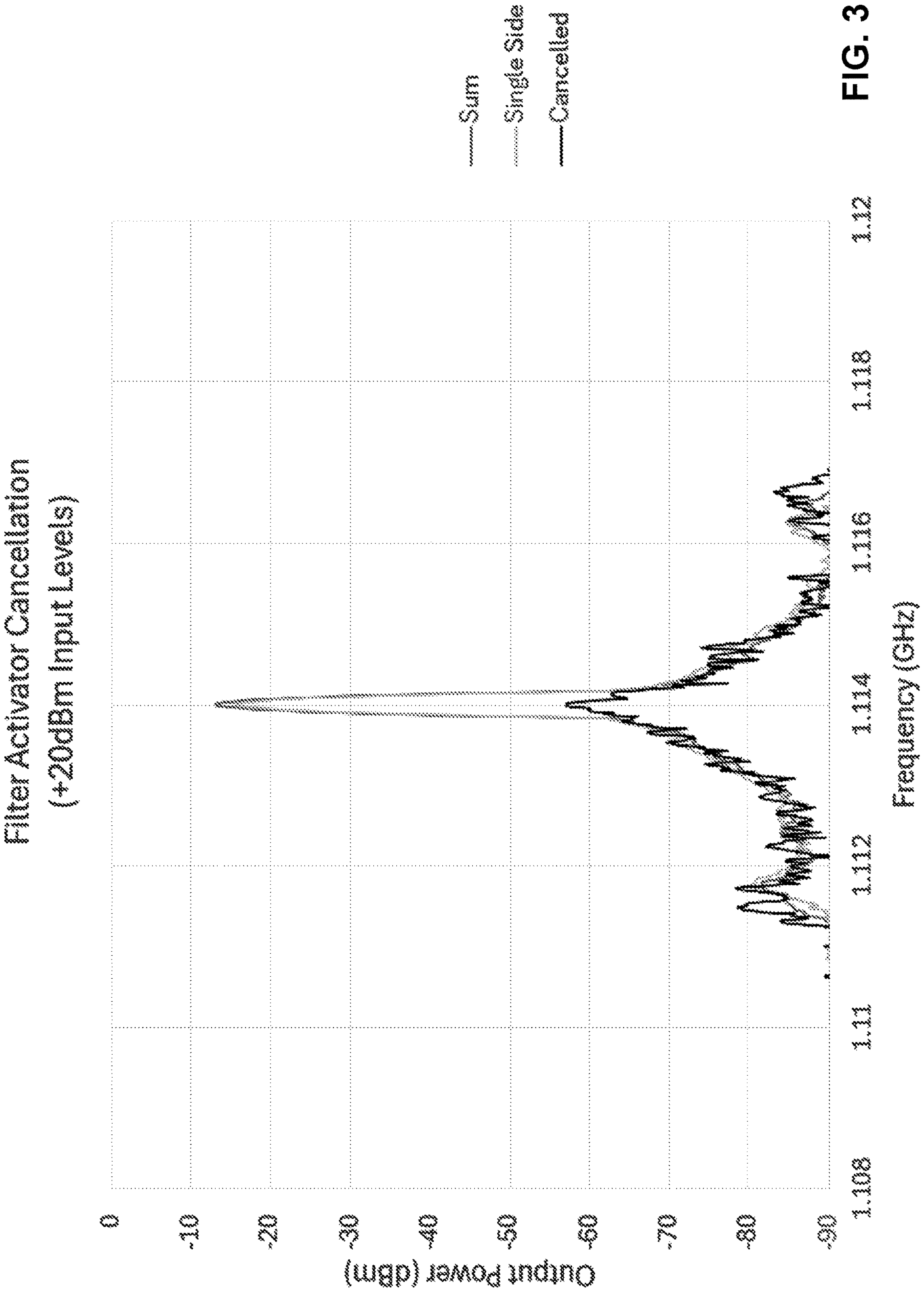
FIG. 3 is a graph showing measured results of activator cancellation.

Measured results of activator signal cancellation are shown in FIG. 3. Two symmetric +20 dBm signals are used as activator signals. The FSL power threshold is −10 dBm, so the activator is 30 dB above the power threshold. The 'Single Side' trace shows a single activator signal at the output of the FSL device, limited at around −10 dBm. The 'Sum' trace shows the SWiFT filter output when activator signals in both branches of the SWiFT filter are in phase. The 'Cancelled' trace shows the SWiFT filter output when activator signals in both branches of the SWiFT filter are 180 degrees out of phase. The activator signals are cancelled by more than 45 dB. Additional activator cancellation can be achieved if amplitude adjustment is used after FSL units to compensate for FSL power threshold imperfections introduced in the manufacturing process.

Figure 4:
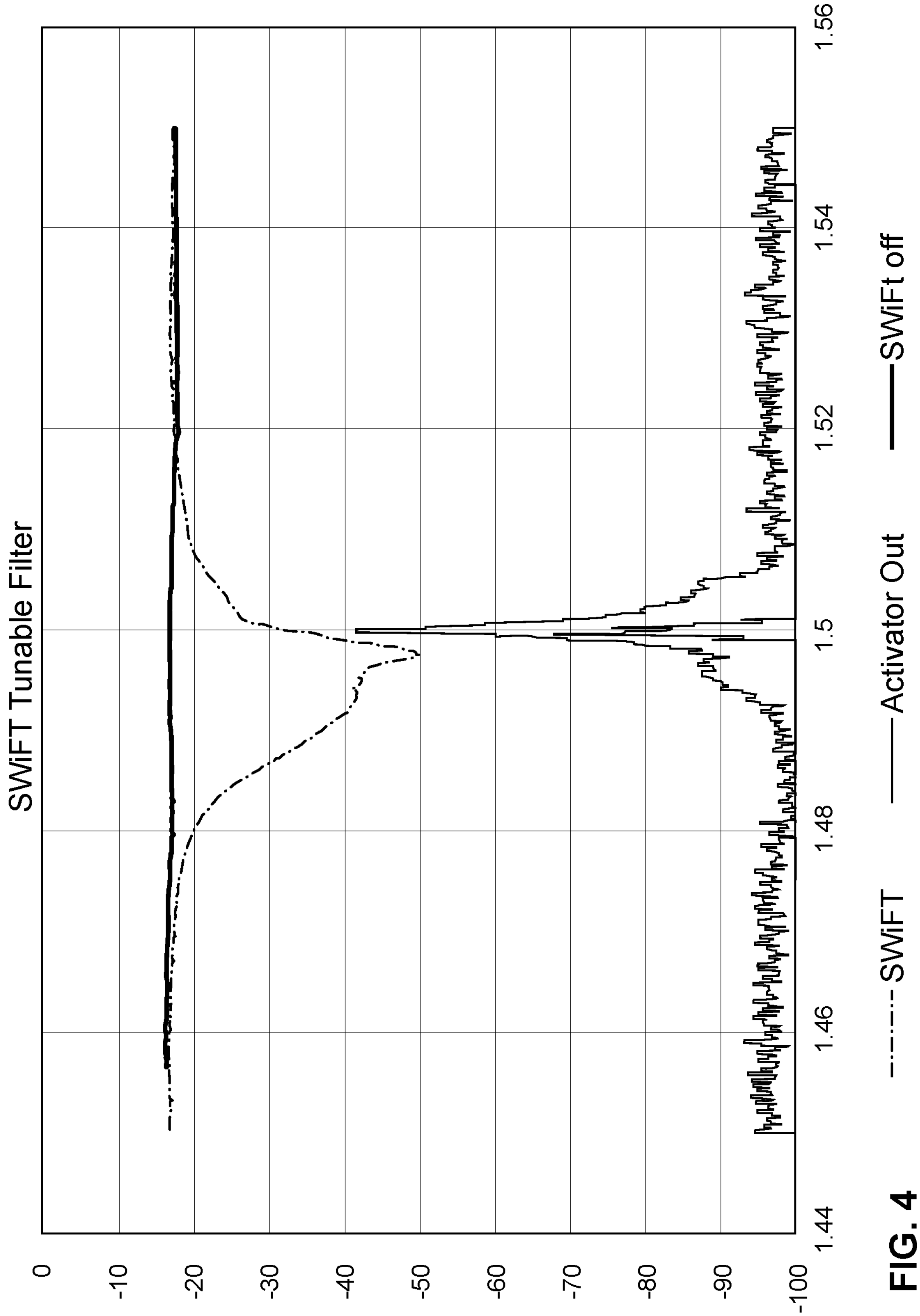
FIG. 4 is a graph showing overall filter performance.

Overall SWiFT filter performance is shown in FIG. 4. The 'SWiFT off' traces show performance of a signal traveling through the SWiFT filter below the FSL power threshold with no activator signals being injected. The 'SWiFT' trace shows the SWiFT filter response with the same signal traveling through the SWiFT filter, but with activator signals being injected at 30 dB above the power threshold. The 'Activator Out' trace shows the remaining activator signals at the SWiFT filter output.

The SWiFT filter provides a tunable filter architecture capable of high Q-factor filter response, fully tunable, high power handling, and fast settling response time, in a compact size.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An electronic filter comprising:

a splitter that is configured to split a signal of interest and an other spectral content onto a first circuit leg and a second circuit leg such that each of the first circuit leg and the second circuit leg receives both the signal of interest and the other spectral content;

a signal generator that is configured to generate an activator signal;

a first combiner on the first circuit leg that is configured to inject the activator signal at a frequency matching the other spectral content;

a second combiner on the second circuit leg that is configured to inject the activator signal at a frequency matching the other spectral content, wherein the activator signal in the second circuit leg is phase shifted approximately 180 degrees relative to the activator signal in the first circuit leg;

a first frequency selective limiter on the first circuit leg configured to attenuate both the activator signal and the other spectral content on the first circuit leg by a first dB of attenuation to a threshold power level of the first frequency selective limiter;

a second frequency selective limiter on the second circuit leg configured to attenuate both the activator signal and the other spectral content on the second circuit leg by a second dB of attenuation to a threshold power level of the second frequency selective limiter; and a third combiner configured to generate a filter output based on combining the attenuated activator signal, the attenuated other spectral content, and the signal of interest from the first frequency selective limiter with the attenuated activator signal, the attenuated other spectral content, and the signal of interest from the second frequency selective limiter.

2. An electronic filter according to claim 1, wherein the signal generator is configured to generate the activator signal based on characteristics of the other spectral content.

3. An electronic filter according to claim 1, wherein the signal generator is configured to generate the activator signal at frequency and power levels above the threshold power level of the first frequency selective limiter and at frequency and power levels above the threshold power level of the second frequency selective limiter.

4. An electronic filter according to claim 3, wherein the activator signal is comprised of a multiplicity of frequencies above the threshold power levels of the first and second frequency selective limiters in order to activate a frequency response by the first and second frequency selective limiters that produces an overall filter response.

5. An electronic filter according to claim 3, wherein N number of additional circuit leg pairs are added with respective frequency selective limiter pairs that cover additional frequency ranges not covered by frequency selective limiter pairs in the N−1 circuit leg pairs, wherein each circuit leg pair is configured so the activator signal is phase shifted approximately 180 degrees in one leg relative to the other leg.

6. An electronic filter according to claim 1, wherein the first and second frequency selective limiters comprise spin wave limiters.

7. An electronic filter according to claim 1, wherein the electronic filter is configured for filtering multiple signals including the signal of interest and the other spectral content input to an antenna, the electronic filter further comprising a low noise amplifier between the antenna and the splitter.

8. An electronic filter according to claim 1, wherein the electronic filter is configured for filtering multiple signals including the signal of interest and the other spectral content input to an antenna, the electronic filter further comprising a pre-frequency selective limiter between the antenna and the splitter.

9. An electronic filter according to claim 1, wherein the third combiner comprises a 180-degree hybrid combiner including a delta port outputting to the signal generator.

10. An electronic filter according to claim 9, wherein the signal generator comprises a field programmable gate array (FPGA).

11. An electronic filter according to claim 10, wherein the delta port is configured to output to the FPGA for active feedback and adjustment of the activator signal.

12. An electronic filter according to claim 1, wherein the other spectral content is a jammer signal.

13. An electronic filter according to claim 1, wherein the first and second frequency selective limiters are configured such that the attenuation by the first and second frequency selective limiters is a frequency specific attenuation that attenuates the other spectral content and does not attenuate the signal of interest.

14. An electronic filter for filtering multiple signals including a signal of interest and a jammer signal input to an antenna, the electronic filter comprising:

a first circuit leg configured to receive the signal of interest and the jammer signal;

a second circuit leg in parallel with the first circuit leg and configured to receive the signal of interest and the jammer signal;

an input combiner on each of the first circuit leg and the second circuit leg that is configured to inject an activator signal on each of the first and second circuit legs at a frequency matching the jammer signal, wherein the activator signal in the second circuit leg is phase shifted approximately 180 degrees relative to the activator signal in the first circuit leg;

a spin wave limiter on each of the first circuit leg and the second circuit leg that is configured to attenuate the jammer signal and the activator signal to a threshold power level of the spin wave limiter; and an output combiner configured to combine an output signal on the first circuit leg with an output signal on the second circuit leg and generate a filter output.

15. An electronic filter according to claim 14, further comprising a signal generator that is configured to generate the activator signal.

16. An electronic filter according to claim 15, wherein the signal generator is configured to generate the activator signal based on characteristics of the jammer signal.

17. An electronic filter according to claim 15, wherein the signal generator is configured to generate the activator signal at frequency and power levels above the threshold power level of the spin wave limiter.

18. An electronic filter according to claim 17, wherein the activator signal is comprised of a multiplicity of frequencies above the threshold power level in order to activate a frequency response by the spin wave limiter on each of the first and second circuit legs that produces an overall filter response.

19. An electronic filter according to claim 17, wherein N number of additional circuit leg pairs are added with respective spin wave limiter pairs that cover additional frequency ranges not covered by the spin wave limiter pairs in the N−1 circuit leg pairs, wherein each circuit leg pair is configured so the activator signal is phase shifted approximately 180 degrees in one leg relative to the other leg.

20. An electronic filter according to claim 15, wherein the output combiner comprises a 180-degree hybrid combiner including a delta port outputting to the signal generator.

21. An electronic filter according to claim 20, wherein the signal generator comprises a field programmable gate array (FPGA).

22. An electronic filter according to claim 21, wherein the delta port is configured to output to the FPGA for active feedback and adjustment of the activator signal.

23. An electronic filter according to claim 14, further comprising a splitter in series with the antenna that is configured to split the signal of interest and the jammer signal such that both the signal of interest and the jammer signal flow through each of the first circuit leg and the second circuit leg.

24. An electronic filter according to claim 23, further comprising a low noise amplifier between the antenna and the splitter.

25. An electronic filter according to claim 23, further comprising a pre-spin wave limiter between the antenna and the splitter.

26. A method of filtering multiple signals comprising:

splitting, with a splitter, a signal of interest and an other spectral content onto a first circuit leg and a second circuit leg such that both the signal of interest and the other spectral content flow through each of the first circuit leg and the second circuit leg;

generating, with a signal generator, an activator signal;

injecting, with a first combiner on the first circuit leg, the activator signal at a frequency matching the other spectral content;

injecting, with a second combiner on the second circuit leg, the activator signal at a frequency matching the other spectral content, wherein the activator signal in the second circuit leg is phase shifted approximately 180 degrees relative to the activator signal in the first circuit leg;

attenuating, with a first frequency selective limiter on the first circuit leg, both the activator signal and the other spectral content on the first circuit leg by a first dB of attenuation to a threshold power level of the first frequency selective limiter;

attenuating, with a second frequency selective limiter on the second circuit leg, both the activator signal and the other spectral content on the second circuit leg by a second dB of attenuation to a threshold power level of the second frequency selective limiter; and generating, with a third combiner, a filter output by combining the attenuated activator signal, the attenuated other spectral content, and the signal of interest from the first frequency selective limiter with the attenuated activator signal, the attenuated other spectral content, and the signal of interest from the second frequency selective limiter.

* * * * *